United States Patent
He (10) Patent No.: US 10,755,148 B2
(45) Date of Patent: Aug. 25, 2020

(54) METHOD AND APPARATUS FOR GENERATING A RESPONSE BASED ON ARTIFICIAL INTELLIGENCE, AND STORAGE MEDIUM

(71) Applicant: BAIDU ONLINE NETWORK TECHNOLOGY (BEIJING) CO., LTD., Beijing (CN)

(72) Inventor: Qiaozhi He, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 232 days.

(21) Appl. No.: 15/991,417

(22) Filed: May 29, 2018

(65) Prior Publication Data
US 2018/0373965 A1   Dec. 27, 2018

(30) Foreign Application Priority Data
Jun. 22, 2017   (CN) .................... 2017 1 04803101

(51) Int. Cl.
*G06F 17/27* (2006.01)
*G06K 9/62* (2006.01)
(Continued)

(52) U.S. Cl.
CPC ....... *G06K 9/6282* (2013.01); *G06F 16/3329* (2019.01); *G06F 40/30* (2020.01);
(Continued)

(58) Field of Classification Search
CPC ....... G06K 9/6282; G06F 40/35; G06F 40/30; G06F 16/3329; G06F 16/3344;
(Continued)

(56) References Cited

U.S. PATENT DOCUMENTS
2014/0067842 A1   3/2014   Chen et al.

FOREIGN PATENT DOCUMENTS

| CN | 1268711 A | 10/2000 |
|---|---|---|
| CN | 1856790 A | 11/2006 |

(Continued)

OTHER PUBLICATIONS

Chinese Office Action dated Mar. 23, 2020, for related Chinese Appln. No. 201710480310.1; 5 Pages.
(Continued)

*Primary Examiner* — Thierry L Pham
(74) *Attorney, Agent, or Firm* — Brooks Kushman PC (57) ABSTRACT

A method and apparatus for generating a response based on artificial intelligence, and a storage medium. The method comprises: generating a response forest which employs a multi-way tree data structure, the multi-way tree at least comprising three layers of nodes: a root node, domain nodes and role nodes arranged in a top-bottom order, each leaf node respectively corresponding to at least one response template corresponding to information on the leaf node path; obtaining a user question, searching the response forest according to the user question to obtain a leaf node corresponding to the user question, and regarding a response template corresponding to the obtained leaf node as a candidate response template; generating a to-be-broadcast response according to the user question and the candidate response template, and broadcasting the to-be-broadcast response to the user. The solution of the present disclosure exhibits wide applicability and can improve the response broadcasting effect.

18 Claims, 5 Drawing Sheets

(51) Int. Cl.
  *G10L 15/06*   (2013.01)
  *G10L 15/08*   (2006.01)
  *G10L 15/22*   (2006.01)
  *G06F 16/332*  (2019.01)
  *G06F 40/30*   (2020.01)
  *G06F 40/35*   (2020.01)
  *G06F 17/21*   (2006.01)

(52) U.S. Cl.
  CPC .............. *G06F 40/35* (2020.01); *G10L 15/06* (2013.01); *G10L 15/08* (2013.01); *G10L 15/22* (2013.01); *G10L 2015/088* (2013.01)

(58) Field of Classification Search
  CPC ....... G06F 16/322; G10L 15/22; G10L 15/08; G10L 15/06; G10L 2015/088
  USPC ........................................................... 704/9
  See application file for complete search history.

(56)  References Cited

FOREIGN PATENT DOCUMENTS

| CN | 102609445 A | 7/2012 |
| CN | 103020052 A | 4/2013 |
| CN | 103795876 A | 5/2014 |
| CN | 106407196 A | 2/2017 |
| CN | 106528531 A | 3/2017 |

OTHER PUBLICATIONS

Chinese Search Report dated Mar. 17, 2020 for related Chinese Appln. No. 2017104803101; 3 Pages.

```
<template id="邻家小妹播放歌曲仅歌手">
    <description>邻家小妹播放歌曲仅歌手</description>
    <pattern stress="5" content="首语气词#0.8|我也是|@byartist|的小迷妹哦, |邻家小妹播放|@name"/>
    <pattern stress="5" content="确认#0.8|@byartist|唱的太棒啦, |邻家小妹播放|@name"/>
    <pattern stress="5" content="确认#0.8|邻家小妹播放#0.8|@name"/>
    <param>
        <role>emo-CP</role>
        <intent>play|search</intent>
        <mood>default</mood>
        <speed>default</speed>
        <datas>yes</datas>
        <hparam>byartist</hparam>
    </param>
</template>
```

METHOD AND APPARATUS FOR GENERATING A RESPONSE BASED ON ARTIFICIAL INTELLIGENCE, AND STORAGE MEDIUM

The present application claims the priority of Chinese Patent Application No. 2017104803101, filed on Jun. 22, 2017, with the title of "Method and apparatus for generating a response based on artificial intelligence, and storage medium". The disclosure of the above applications is incorporated herein by reference in its entirety.

FIELD OF DISCLOSURE

The present disclosure relates to computer application technologies, and particularly to a method and apparatus for generating a response based on artificial intelligence, and a storage medium.

BACKGROUND OF DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

As technologies develop, human-machine dialogue products are applied more and more widely. Current main human-machine dialogue products are usually classified according to domains, i.e., a product corresponds to a domain.

In addition, in the current human-machine dialogue products, when a response to the user's question is broadcast, usually there is only one role.

That is to say, the current human-machine dialogue products mainly employ a single-domain and single-role implementation mode so that the products exhibit an undesirable applicability and are only adapted for a single domain, and the response broadcasting effect is undesirable.

SUMMARY OF DISCLOSURE

In view of the above, the present disclosure provides a method and apparatus for generating a response based on artificial intelligence, and a storage medium, which exhibit wide applicability and can improve the response broadcasting effect.

Specific technical solutions are as follows:

A method for generating a response based on artificial intelligence, comprising:

generating a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies;

obtaining a user question, and searching the response forest according to the user question to obtain a leaf node corresponding to the user question;

regarding a response template corresponding to the obtained leaf node as a candidate response template;

generating a to-be-broadcast response according to the user question and the candidate response template, and broadcasting the to-be-broadcast response to the user.

According to a preferred embodiment of the present disclosure, the searching the response forest according to the user question to obtain a leaf node corresponding to the user question comprises:

obtaining a semantic parsing result of the user question, the semantic parsing result at least including: domain and role information;

searching the response forest according to the sematic parsing result to obtain a leaf node matched with the semantic parsing result.

According to a preferred embodiment of the present disclosure, the generating a to-be-broadcast response according to the user question and the candidate response template comprises:

according to the user question, performing slot replacement for each candidate response template, to obtain candidate responses;

removing candidate responses incompliant with requirements from the candidate responses;

selecting one from the remaining candidate responses as the to-be-broadcast response.

According to a preferred embodiment of the present disclosure, the performing slot replacement for each candidate response template comprises:

obtaining a content query result of the user question;

for each candidate response template, respectively replacing a first class of slots in the candidate response template according to the content query result, and replacing a second class of slots in the candidate response template according to a preset candidate replacement set.

According to a preferred embodiment of the present disclosure, the removing candidate responses incompliant with requirements from the candidate responses comprises:

removing, from the candidate responses, the candidate responses including the first class of slots that are not replaced;

the selecting one from the remaining candidate responses as the to-be-broadcast response comprises:

randomly selecting one from the remaining candidate responses as the to-be-broadcast response.

According to a preferred embodiment of the present disclosure, the selecting one from the remaining candidate responses as the to-be-broadcast response further comprises:

with respect to each word in the to-be-broadcast response, determining whether the word is located in a pre-generated word stock;

if yes, labelling the word according to a broadcast manner information of the word defined in the word stock;

regarding the labeled response as the to-be-broadcast response.

An apparatus for generating a response based on artificial intelligence, comprising: a pre-processing unit, a searching unit and a generating unit;

the pre-processing unit is configured to generate a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies;

the searching unit is configured to obtain a user question, search the response forest according to the user question to obtain a leaf node corresponding to the user question, and regard a response template corresponding to the obtained leaf node as a candidate response template;

the generating unit is configured to generate a to-be-broadcast response according to the user question and the candidate response template, and broadcast the to-be-broadcast response to the user.

According to a preferred embodiment of the present disclosure, the searching unit obtains a semantic parsing result of the user question, the semantic parsing result at least including: domain and role information, and searches the response forest according to the sematic parsing result to obtain a leaf node matched with the semantic parsing result.

According to a preferred embodiment of the present disclosure, the generating unit comprises: a replacing sub-unit, a screening sub-unit and a broadcasting sub-unit;

the replacing sub-unit is configured to, according to the user question, perform slot replacement for each candidate response template, to obtain the candidate responses;

The screening sub-unit is configured to remove candidate responses incompliant with requirements from the candidate responses, and select one from the remaining candidate responses as a to-be-broadcast response;

the broadcasting sub-unit is configured to broadcast the to-be-broadcast response to the user.

According to a preferred embodiment of the present disclosure, the replacing sub-unit obtains a content query result of the user question, and for each candidate response template, respectively replaces a first class of slots in the candidate response template according to the content query result, and replaces a second class of slots in the candidate response template according to a preset candidate replacement set.

According to a preferred embodiment of the present disclosure, the screening sub-unit removes the candidate responses including the first class of slots that are not replaced, and randomly selects one from the remaining candidate responses as the to-be-broadcast response.

According to a preferred embodiment of the present disclosure, the generating unit further comprises: a labeling sub-unit;

the labeling sub-unit is configured to, with respect to each word in the to-be-broadcast response, determine whether the word is located in a pre-generated word stock, and if yes, label the word according to a broadcast manner information of the word defined in the word stock, and regard the labelled response as the to-be-broadcast response.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of present disclosure is employed to generate the response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies. As such, after the user question is obtained, it is feasible to first search the response forest according to the user question to obtain a leaf node corresponding to the user question, and regard a response template corresponding to the obtained leaf node as a candidate response template, and generate a to-be-broadcast response according to the user question and the candidate response template, and broadcast the to-be-broadcast response to the user. As compared with the prior art, the solution of the present disclosure implements multi-domain multi-role response generation, i.e., the solutions are simultaneously applicable for different domains and therefore have wide applicability, and furthermore, different roles may be used for response broadcasting, thereby improving the broadcasting effect.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
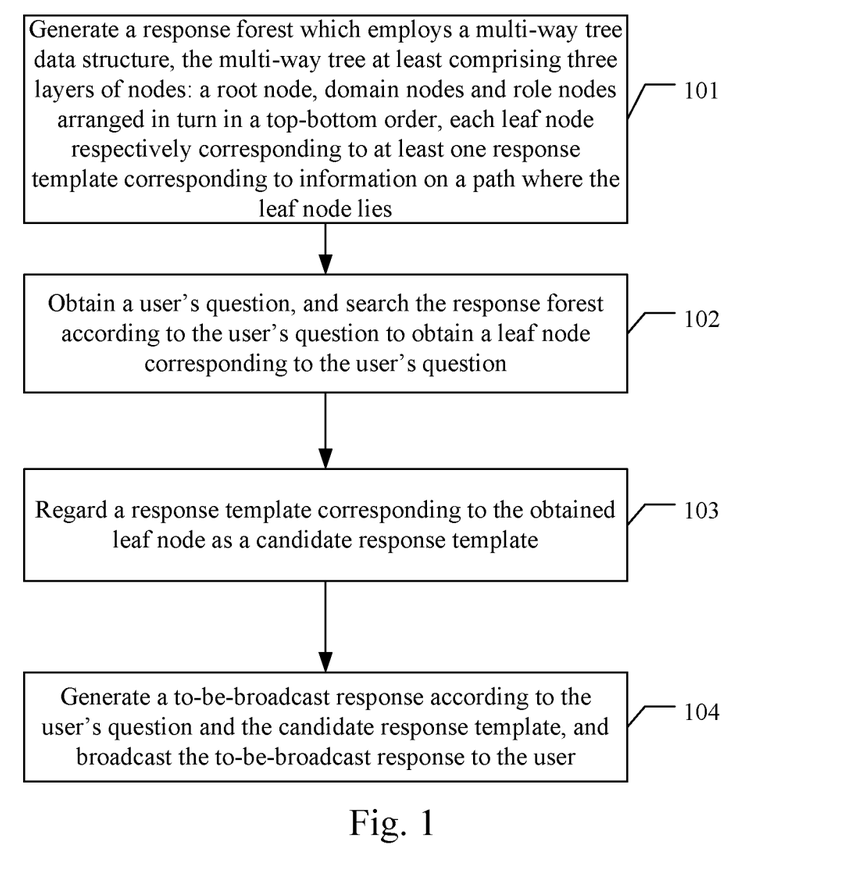
FIG. 1 is a flow chart of a first embodiment of a method of generating a response according to the present disclosure.

FIG. 1 is a flow chart of a first embodiment of a method of generating a response according to the present disclosure. As shown in FIG. 1, the embodiment comprises the following specific implementation mode.

In 101 is generated a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies.

To implement the solution of the present embodiment, it is necessary to first generate the response forest which employs a multi-way tree data structure, and different branches in the data structure correspond to different content.

Figure 2:
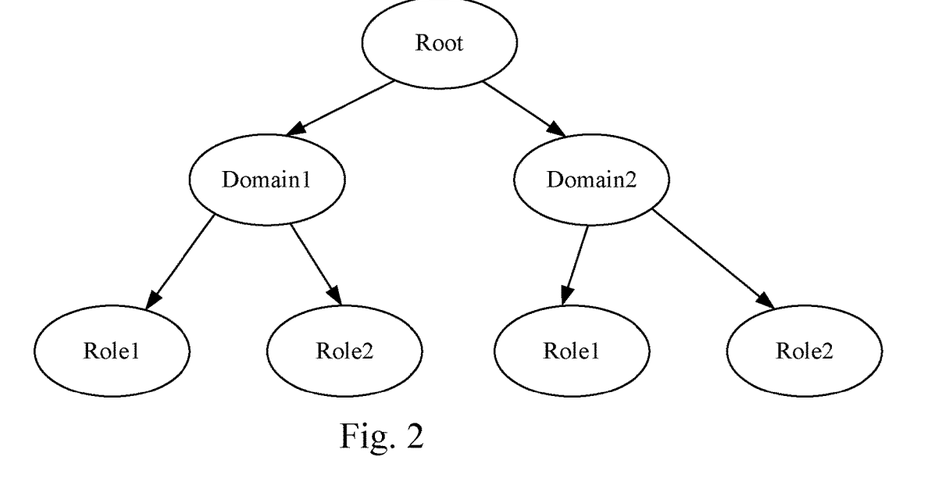
FIG. 2 is a structural schematic diagram of a multi-way tree according to the present disclosure.

FIG. 2 is a structural schematic diagram of a multi-way tree according to the present disclosure. As shown in FIG. 2, the multi-way tree comprises three layers of nodes: a root node at the topmost layer, domain nodes at a layer below the root node, and role nodes at a layer below the domain nodes.

The above description only takes an example in which the multi-way tree includes three layers of nodes, but this is not intended to limit the technical solution of the present disclosure. In practical application, the multi-way tree may further comprise more layers of nodes, for example, a layer of nodes below role nodes may be intent nodes, a layer of nodes below intent nodes may be mood nodes, and so on.

The specific number of layers of nodes included by the multi-way tree may depend on actual needs.

The above domains may include music, weather and so on. Role may include neighbor girl (a virtual role of a naughty and cute female) and an overbearing president (a virtual role of a cold and simple male) and so on. Regarding the domain of music, its intent may include play, play control and so on. Regarding the domain of weather, its intent may include searching for weather, air temperature and so on.

Domains specifically included in the multi-way tree, roles corresponding to each domain and intents corresponding to each role may be determined according to actual needs, for example, may be set according to needs of products, projects and service.

Furthermore, the multi-way tree, after being generated, may be updated at any time according to actual needs, for example by adding new domains and new roles.

In addition, each leaf node in the multi-way tree respectively corresponds to at least one response template corresponding to information on a path where the leaf node lies.

Figure 3:
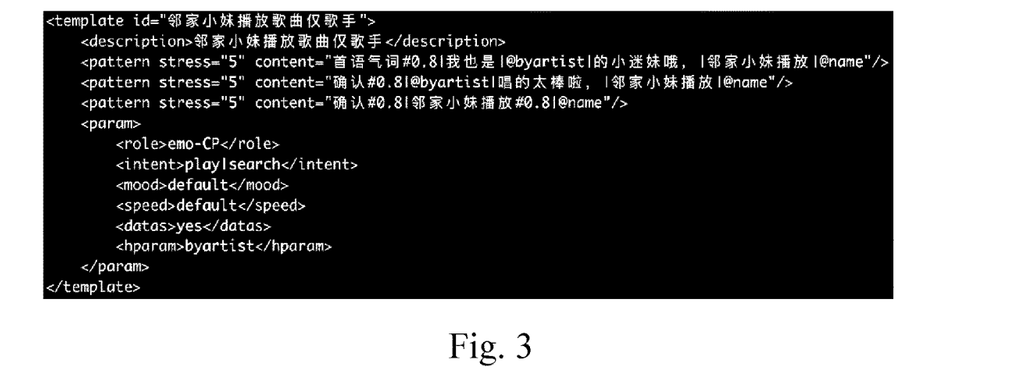
FIG. 3 is a schematic diagram of an example of a response template according to the present disclosure.

FIG. 3 is a schematic diagram of an example of a response template according to the present disclosure. Each response template is matched with information on the path where the corresponding leaf node lies, namely, matched with the domain and role on the path where the corresponding leaf node lies.

102 relates to obtaining a user question, and searching the response forest according to the user question to obtain a leaf node corresponding to the user question.

In a human-machine interaction product, the user interacts with a machine in a speech form, and the obtained user question in the speech form first needs to be converted into a user question in a text forms through a speech recognition technology. The user questions stated in the present disclosure all refer to the user question in the text form.

It is feasible to first obtain a semantic parsing result of the obtained user question according to the prior art. The semantic parsing result at least includes: domain and role information, wherein the domain refers to a domain to which the user question belongs, and the role refers to a role designed in the user question. If the user does not designate the role, a default role may be employed. In addition to domain and role information, the semantic parsing information may further include information such as intent. The specific information included in the semantic parsing result may depend on actual needs.

Then, it is possible to search the response forest according to the sematic parsing result to obtain a leaf node matched with the semantic parsing result.

The response forest shown in FIG. 2 is taken as an example. After the semantic parsing result is obtained, it is feasible to search for the second layer of nodes in the multi-way tree according to domain information in the semantic parsing result, for example, find Domain 1, then search for next layer of nodes below Domain 1 according to role information in the semantic parsing result, for example, find Role 2, and then Role 2 is a leaf node matched with the semantic parsing result.

In 103, a response template corresponding to the obtained leaf node is regarded as a candidate response template.

As stated above, each leaf node corresponds to at least one response template, usually a plurality of response templates. Then, after the leaf node matched with the semantic parsing result is obtained, the response template corresponding to the leaf node is determined as the candidate response template.

In 104, a to-be-broadcast response is generated according to the user question and the candidate response template, and broadcast to the user.

To generate the to-be-broadcast response, first it is possible to, according to the user question, perform slot replacement for each candidate response template, to obtain the candidate response.

Specifically, a content query result of the user question may be obtained. The content query result refers to content information obtained according to user's demand. The domain of music is taken as an example. When the user's demand is "play a song of Andy Lau", the content query result may include: singer-Andy Lau, song name-Wangqingshui, and an album to which the song belongs.

As such, it is feasible to, for each candidate response template, respectively replace a first class of slots in the candidate response template according to the content query result, and replace a second class of slots in the candidate response template according to a preset candidate replacement set.

It is assumed that the obtained candidate response template is "initial modal particle #0.6 neighbor girl plays #0.8@name of @byartist (Chinese expression: 首语气词 #0.6 邻家小妹播放 #0.8@byartist 的 @name)" and "initial modal particle #0.6 neighbor girl plays #0.8@name (Chinese expression: 首语气词 #0.6 邻家小妹播放 #0.8@name)".

In the above two candidate response templates, "@byartist" and "@name" are the first class of slots, and may be replaced with "Andy Lau" and "Wangqingshui", respectively. It can be seen that the first class of slots refer to slots directly related to the user's demand.

In practical application, the first class of slots may be replaced according to the content query result. In addition, other information such as semantic parsing result might be used, depending on actual situations.

In the above two candidate response templates, "initial modal particle (Chinese expression: 首 (shou) 语 (yu) 气 (qi) 词 (ci))" and "neighbor girl plays (Chinese expression: 邻 (lin) 家 (jia) 小 (xiao) 妹 (mei) 播 (bo) 放 (fang))" are the second class of slots, and the number that follows represents a certain probability of occurrence. For example, "initial modal particle" occurs with a 60% probability, and "neighbor girl plays" occurs with an 80% probability. In addition, numbers might be absent, which indicates they will occur with a 100% probability, namely, certainly occur.

If the "initial modal particle" occurs, it is possible to randomly select one from a preset/pre-generated candidate replacement set corresponding to the "initial modal particle", and use the selected replacement content to replace the "initial modal particle". The corresponding candidate replacement set may be {well (Chinese expression: 嗯 (en) 嗯 (en)), lalala (Chinese expression: 啦啦啦 ), terrific} or the like If "neighbor girl plays" occurs, it is possible to randomly select one from a preset/pre-generated candidate replacement set corresponding to the "neighbor girl plays", and use the selected replacement content to replace the "neighbor girl plays". The corresponding candidate replacement set may be {play for you right now (Chinese expression: 这 (zhe) 就 (jiu) 为 (wei) 您 (nin) 播 (bo) 放 (fang)), prepare to play for you (Chinese expression: 准 (zhun) 备 (bei) 为 (wei) 您 (nin) 播 (bo) 放 (fang))} or the like.

The second class of slots are replaced in the above manner so that the generated responses are made more diverse.

After the replacement, with respect to the two candidate response templates "initial modal particle #0.6 neighbor girl plays #0.8@name of @byartist (Chinese expression: 首语气词 #0.6 邻家小妹播放 #0.8@byartist 的 @name)" and "initial modal particle #0.6 neighbor girl plays #0.8@name (Chinese expression: 首语气词 #0.6 邻家小妹播放 #0.8@name)", the following two corresponding candidate responses may be obtained respectively: "well, play Andy Lau's Wangqingshui for you right now (Chinese expression: 嗯 (en) 嗯 (en), 这 (zhe) 就 (jiu) 为 (wei) 您 (nin) 播 (bo) 放 (fang) 刘 (liu) 德 (de) 华 (hua) 的 (de) 忘 (wang) 情 (qing) 水 (shui))" and "lalala, prepare to play Wangqingshui for you (Chinese expression: 啦 (la) 啦 (la) 啦 (la), 准 (zhun) 备 (bei) 为 (wei) 您 (nin) 播 (bo) 放 (fang) 忘 (wang) 情 (qing) 水 (shui))".

After candidate responses corresponding to the candidate response templates are obtained respectively, candidate responses incompliant with requirements might be removed therefrom.

Specifically, it is possible to remove, from the candidate responses, candidate responses including the first class of slots that are not replaced.

For example, the corresponding replacement content, for example, "wangqingshui" is not found, @name will be retained and not replaced, and correspondingly the corresponding candidate response may be removed.

Regarding the remaining candidate responses, a to-be-broadcast response may be selected therefrom. How to select is not limited. For example, a to-be-broadcast response may be randomly selected from the remaining candidate responses.

After the to-be-broadcast response is obtained, to improve the response-broadcasting effect, it is feasible to further perform labelling operation for the to-be-broadcast response, namely, with respect to each word in the to-be-broadcast response, determine whether the word is located in a pre-generated word stock, and if yes, label the word according to a broadcast manner information of the word defined in the word stock, and then regard the labelled response as the to-be-broadcast response.

To this end, it is necessary to pre-generate a word stock, which includes words that need processing specially, namely, words that need broadcasting in a defined broadcast manner. Correspondingly, the word stock needs to include these words and corresponding broadcast manner information. The broadcast manner information may include information such as a broadcast speed, whether to pause, whether to stress, tone and so on.

Assume that the to-be-broadcast response is "well, play Andy Lau's Wangqingshui for you right now (Chinese expression: 嗯 (en) 嗯 (en), 这 (zhe) 就 (jiu) 为 (wei) 您 (nin) 播 (bo) 放 (fang) 刘 (liu) 德 (de) 华 (hua) 的 (de) 忘 (wang) 情 (qing) 水 (shui))", the following may be obtained after the labeling operation is performed: "well<break time="200 ms"/>, play Andy Lau's <emphasis level="strong">Wangqingshui</emphasis> for you right now".

Upon completion of the labeling operation, the response may be broadcast to the user. Specific implementation is of the prior art.

Figure 4:
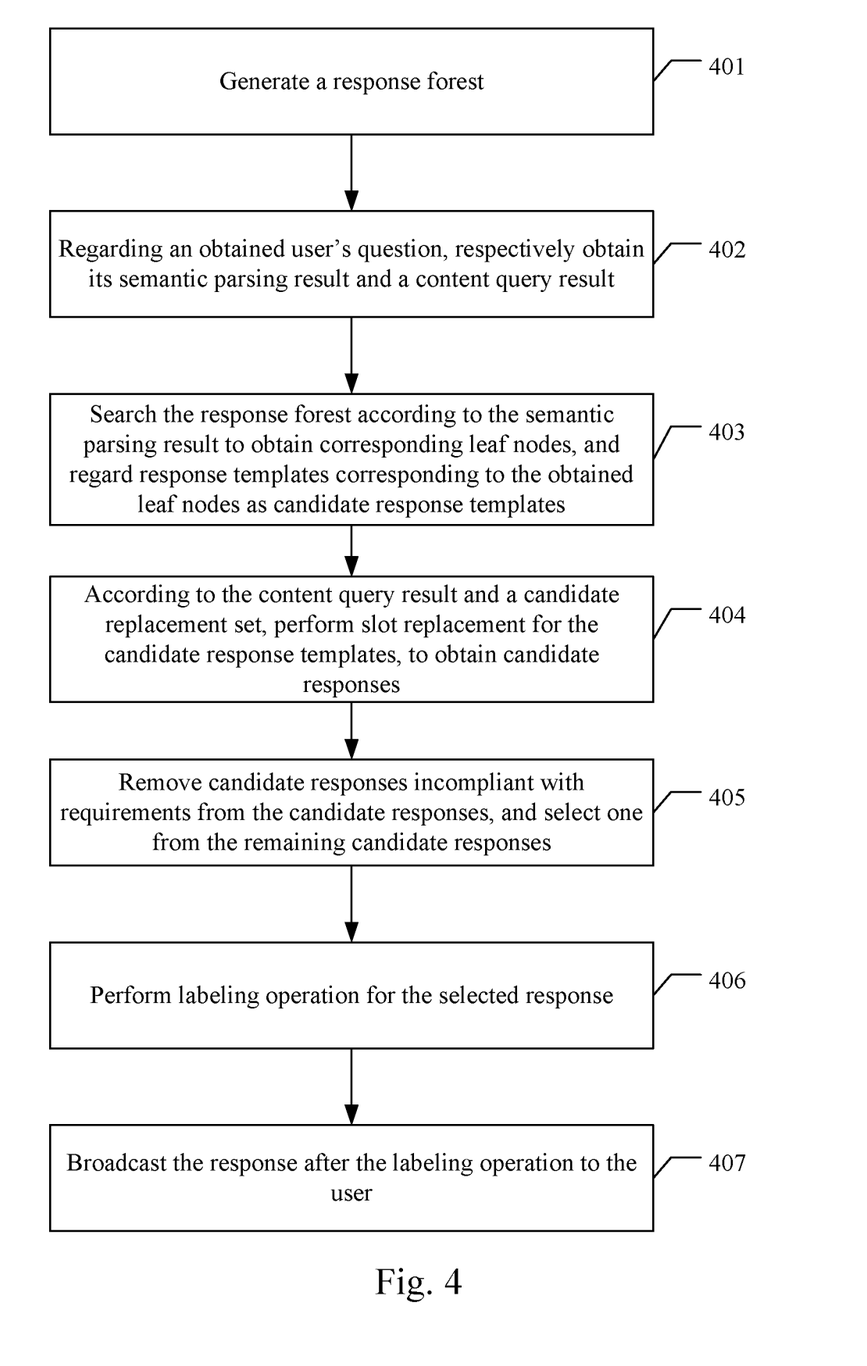
FIG. 4 is a flow chart of a second embodiment of a method of generating a response according to the present disclosure.

Based on the above introduction, FIG. 4 is a flow chart of a second embodiment of a method of generating a response according to the present disclosure. As shown in FIG. 4, the embodiment comprises the following specific implementation mode.

In 401 is generated a response forest.

In 402, regarding an obtained user question, its sematic parsing result and content query result are obtained respectively.

403 relates to searching the response forest according to the semantic parsing result to obtain corresponding leaf nodes, and regarding response templates corresponding to the obtained leaf nodes as candidate response templates.

In 404, according to the content query result and a candidate replacement set, slot replacement is performed for the candidate response templates, to obtain candidate responses.

405 relates to removing candidate responses incompliant with requirements from the candidate responses, and selecting one from the remaining candidate responses.

In 406, labeling operation is performed for the selected response.

In 407, the response after the labeling operation is broadcast to the user.

It can be seen that the solutions of the above method embodiments may be employed to implement multi-domain multi-role response generation, i.e., the solutions are simultaneously applicable for different domains and therefore have wide applicability, and furthermore, different roles may be used for response broadcasting, thereby improving the broadcasting effect.

In addition, the solutions of the above method embodiments may be employed to update domains, roles, response templates and the like in the response forest at any time according to actual needs, which facilitates maintenance, controllability and expansion.

The above introduces the method embodiments. The solution of the present disclosure will be further described through an apparatus embodiment.

Figure 5:
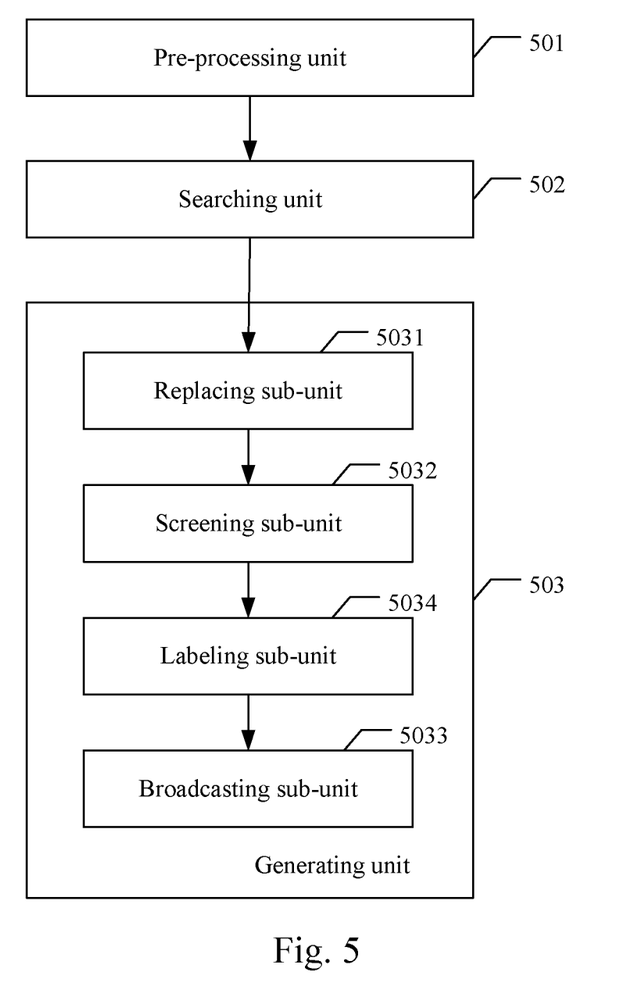
FIG. 5 is a block diagram of an embodiment of an apparatus for generating a response according to the present disclosure.

FIG. 5 is a block diagram of an embodiment of an apparatus for generating a response according to the present disclosure. As shown in FIG. 5, the apparatus comprises: a pre-processing unit 501, a searching unit 502 and a generating unit 503.

The pre-processing unit 501 is configured to generate a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies.

The searching unit 502 is configured to obtain a user question, search the response forest according to the user question, obtain a leaf node corresponding to the user question, and regard a response template corresponding to the obtained leaf node as a candidate response template.

The generating unit 503 is configured to generate a to-be-broadcast response according to the user question and the candidate response template, and broadcast the to-be-broadcast response to the user.

The response forest, namely, the multi-way tree structure generated by the pre-processing unit 501 may be as shown in FIG. 2. As shown in FIG. 2, the multi-way tree comprises three layers of nodes: a root node at the topmost layer, domain nodes at a layer below the root node, and role nodes at a layer below the domain nodes.

In practical application, the multi-way tree may further comprise more layers of nodes, for example, a layer of nodes below role nodes may be intent nodes.

Each leaf node in the multi-way tree respectively corresponds to at least one response template corresponding to information on a path where the leaf node lies.

The searching unit 502, after obtaining the user question, may first obtain a semantic parsing result of the obtained user question according to the prior art, the semantic parsing result at least including: domain and role information, and then search the response forest according to the sematic parsing result to obtain a leaf node matched with the semantic parsing result.

As stated above, each leaf node corresponds to at least one response template, usually a plurality of response templates. Then, after the leaf node matched with the semantic parsing result is obtained, the response template corresponding to the leaf node is determined as the candidate response template.

As shown in FIG. 3, the generating unit 503 may specifically comprise: a replacing sub-unit 5031, a screening sub-unit 5032 and a broadcasting sub-unit 5033.

The replacing sub-unit 5031 is configured to, according to the user question, perform slot replacement for each candidate response template, to obtain the candidate responses.

The screening sub-unit 5032 is configured to remove candidate responses incompliant with requirements from the candidate responses, and select one from the remaining candidate responses as a to-be-broadcast response.

The broadcasting sub-unit 5033 is configured to broadcast the to-be-broadcast response to the user.

Specifically, the replacing sub-unit 5031 may obtain a content query result of the user question, and for each candidate response template, respectively replace a first class of slots in the candidate response template according to the content query result, and replace a second class of slots in the candidate response template according to a preset candidate replacement set.

Regarding a specific replacement manner, please refer to the relevant depictions in 104 shown in FIG. 1.

Regarding the candidate responses obtained after the replacement, the screening sub-unit 5032 may further remove therefrom candidate responses including the first class of slots that are not replaced, and then select one from the remaining candidate responses as a to-be-broadcast response.

As shown in FIG. 5, after the to-be-broadcast response is obtained, to improve the response-broadcasting effect, a labeling sub-unit 5034 may further perform labelling operation for the to-be-broadcast response, namely, with respect to each word in the to-be-broadcast response, determine whether the word is located in a pre-generated word stock, and if yes, label the word according to a broadcast manner information of the word defined in the word stock, and then regard the labelled response as the to-be-broadcast response.

To this end, it is necessary to pre-generate a word stock, which includes words that need processing specially, namely, words that need broadcasting in a defined broadcast manner. Correspondingly, the word stock needs to include these words and corresponding broadcast manner information. The broadcast manner information may include information such as a broadcast speed, whether to pause, whether to stress, tone and so on.

Reference may be made to corresponding depictions in the aforesaid method embodiment for a specific workflow of the apparatus embodiment shown in FIG. 5. The workflow is not detailed any more It can be seen that the solution of the above apparatus embodiment may be employed to implement multi-domain multi-role response generation, i.e., the solutions are simultaneously applicable for different domains and therefore have wide applicability, and furthermore, different roles may be used for response broadcasting, thereby improving the broadcasting effect.

In addition, the solution of the above apparatus embodiment may be employed to update domains, roles, response templates and the like in the response forest at any time according to actual needs, which facilitates maintenance, controllability and expansion.

Figure 6:
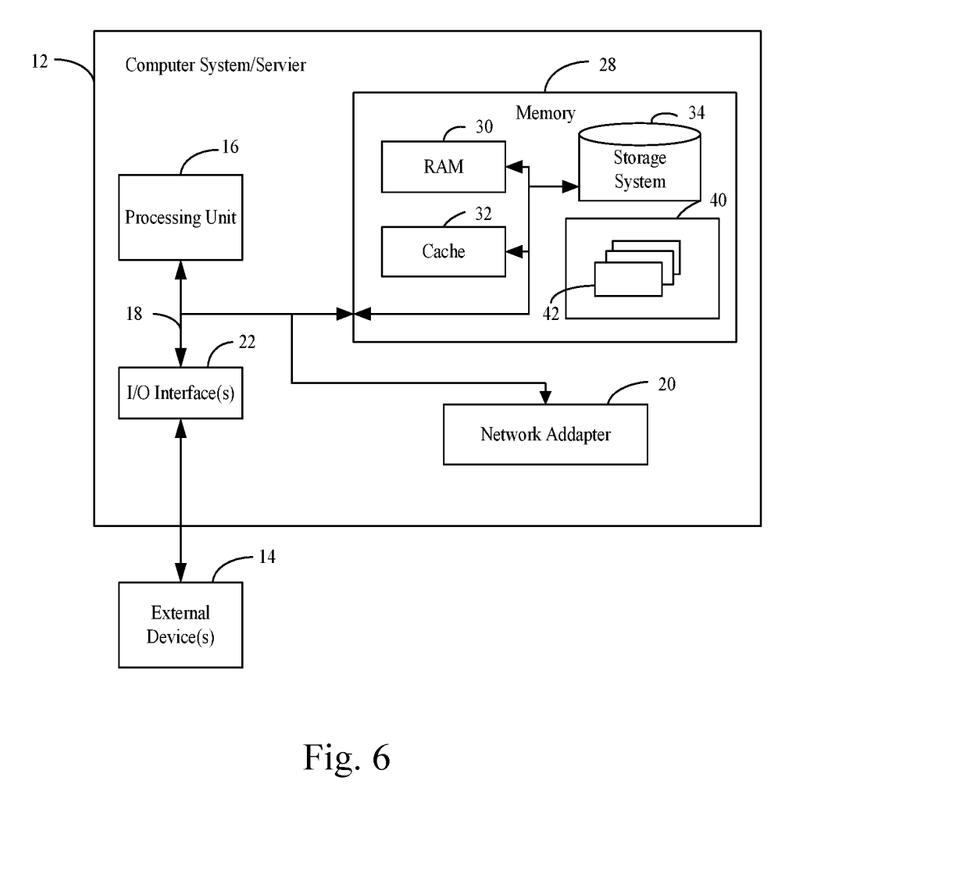
FIG. 6 is illustrates a block diagram of an example computer system/server 12 adapted to implement an implementation mode of the present disclosure.

FIG. 6 illustrates a block diagram of an example computer system/server 12 adapted to implement an implementation mode of the present disclosure. The computer system/server 12 shown in FIG. 6 is only an example and should not bring about any limitation to the function and scope of use of the embodiments of the present disclosure.

As shown in FIG. 6, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 6, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, generate a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies;

obtain a user question, search the response forest according to the user question, obtain a leaf node corresponding to the user question, and regard a response template corresponding to the obtained leaf node as a candidate response template;

generate a to-be-broadcast response according to the user question and the candidate response template, and broadcast the to-be-broadcast response to the user.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for generating a response based on artificial intelligence, wherein the method comprises:
generating a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies;
obtaining a user's question, and searching the response forest according to the user's question to obtain a leaf node corresponding to the user's question;
regarding a response template corresponding to the obtained leaf node as a candidate response template;
generating a to-be-broadcast response according to the user's question and the candidate response template, and broadcasting the to-be-broadcast response to the user.

2. The method according to claim 1, wherein
the searching the response forest according to the user's question to obtain a leaf node corresponding to the user's question comprises:
obtaining a semantic parsing result of the user's question, the semantic parsing result at least including: domain and role information;
searching the response forest according to the sematic parsing result to obtain a leaf node matched with the semantic parsing result.

3. The method according to claim 1, wherein
the generating a to-be-broadcast response according to the user's question and the candidate response template comprises:
according to the user's question, performing slot replacement for each candidate response template, to obtain candidate responses;
removing candidate responses incompliant with requirements from the candidate responses;
selecting one from the remaining candidate responses as the to-be-broadcast response.

4. The method according to claim 3, wherein
the performing slot replacement for each candidate response template comprises:
obtaining a content query result of the user's question;
for each candidate response template, respectively replacing a first class of slots in the candidate response template according to the content query result, and replacing a second class of slots in the candidate response template according to a preset candidate replacement set.

5. The method according to claim 4, wherein
the removing candidate responses incompliant with requirements from the candidate responses comprises:
removing, from the candidate responses, candidate responses including the first class of slots that are not replaced;
the selecting one from the remaining candidate responses as the to-be-broadcast response comprises:
randomly selecting one from the remaining candidate responses as the to-be-broadcast response.

6. The method according to claim 3, wherein
after the selecting one from the remaining candidate responses as the to-be-broadcast response further comprises:
with respect to each word in the to-be-broadcast response, determining whether the word is located in a pre-generated word stock;
if yes, labeling the word according to a broadcast manner information of the word defined in the word stock;
regarding the labeled response as the to-be-broadcast response.

7. A computer device, comprising a memory, a processor and a computer program which is stored on the memory and runs on the processor, wherein the processor, upon executing the program, implements the following operation:
generating a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies;
obtaining a user's question, and searching the response forest according to the user's question to obtain a leaf node corresponding to the user's question;
regarding a response template corresponding to the obtained leaf node as a candidate response template;
generating a to-be-broadcast response according to the user's question and the candidate response template, and broadcasting the to-be-broadcast response to the user.

8. The computer device according to claim 7, wherein
the searching the response forest according to the user's question to obtain a leaf node corresponding to the user's question comprises:
obtaining a semantic parsing result of the user's question, the semantic parsing result at least including: domain and role information;
searching the response forest according to the sematic parsing result to obtain a leaf node matched with the semantic parsing result.

9. The computer device according to claim 7, wherein
the generating a to-be-broadcast response according to the user's question and the candidate response template comprises:
according to the user's question, performing slot replacement for each candidate response template, to obtain candidate responses;
removing candidate responses incompliant with requirements from the candidate responses;
selecting one from the remaining candidate responses as the to-be-broadcast response.

10. The computer device according to claim 9, wherein
the performing slot replacement for each candidate response template comprises:
obtaining a content query result of the user's question;
for each candidate response template, respectively replacing a first class of slots in the candidate response template according to the content query result, and replacing a second class of slots in the candidate response template according to a preset candidate replacement set.

11. The computer device according to claim 10, wherein
the removing candidate responses incompliant with requirements from the candidate responses comprises:
removing, from the candidate responses, candidate responses including the first class of slots that are not replaced;
the selecting one from the remaining candidate responses as the to-be-broadcast response comprises:
randomly selecting one from the remaining candidate responses as the to-be-broadcast response.

12. The computer device according to claim 9, wherein
after the selecting one from the remaining candidate responses as the to-be-broadcast response further comprises:
with respect to each word in the to-be-broadcast response, determining whether the word is located in a pre-generated word stock;
if yes, labeling the word according to a broadcast manner information of the word defined in the word stock;
regarding the labeled response as the to-be-broadcast response.

13. A non-transitory computer-readable storage medium on which a computer program is stored, wherein the program, when executed by a processor, implements the following operation:
generating a response forest which employs a multi-way tree data structure, the multi-way tree at least comprising three layers of nodes: a root node, domain nodes and role nodes arranged in turn in a top-bottom order, each leaf node respectively corresponding to at least one response template corresponding to information on a path where the leaf node lies;
obtaining a user's question, and searching the response forest according to the user's question to obtain a leaf node corresponding to the user's question;
regarding a response template corresponding to the obtained leaf node as a candidate response template;
generating a to-be-broadcast response according to the user's question and the candidate response template, and broadcasting the to-be-broadcast response to the user.

14. The non-transitory computer-readable storage medium according to claim 13, wherein
the searching the response forest according to the user's question to obtain a leaf node corresponding to the user's question comprises:
obtaining a semantic parsing result of the user's question, the semantic parsing result at least including: domain and role information;
searching the response forest according to the sematic parsing result to obtain a leaf node matched with the semantic parsing result.

15. The non-transitory computer-readable storage medium according to claim 13, wherein
the generating a to-be-broadcast response according to the user's question and the candidate response template comprises:
according to the user's question, performing slot replacement for each candidate response template, to obtain candidate responses;
removing candidate responses incompliant with requirements from the candidate responses;
selecting one from the remaining candidate responses as the to-be-broadcast response.

16. The non-transitory computer-readable storage medium according to claim 15, wherein
the performing slot replacement for each candidate response template comprises:
obtaining a content query result of the user's question;
for each candidate response template, respectively replacing a first class of slots in the candidate response template according to the content query result, and replacing a second class of slots in the candidate response template according to a preset candidate replacement set.

17. The non-transitory computer-readable storage medium according to claim 16, wherein
the removing candidate responses incompliant with requirements from the candidate responses comprises:
removing, from the candidate responses, candidate responses including the first class of slots that are not replaced;
the selecting one from the remaining candidate responses as the to-be-broadcast response comprises:
randomly selecting one from the remaining candidate responses as the to-be-broadcast response.

18. The non-transitory computer-readable storage medium according to claim 16, wherein
after the selecting one from the remaining candidate responses as the to-be-broadcast response further comprises:
with respect to each word in the to-be-broadcast response, determining whether the word is located in a pre-generated word stock;
if yes, labeling the word according to a broadcast manner information of the word defined in the word stock;
regarding the labeled response as the to-be-broadcast response.

* * * * *